United States Patent [19]
Lind

[11] Patent Number: 4,706,966
[45] Date of Patent: Nov. 17, 1987

[54] SEAL WITH PRESSURE FLUID FEED

[75] Inventor: Björn Lind, Billdal, Sweden

[73] Assignee: SKF Nova AB, Goteborg, Sweden

[21] Appl. No.: 800,734

[22] Filed: Nov. 22, 1985

[51] Int. Cl.⁴ .......................... F16J 15/40; F16J 15/50
[52] U.S. Cl. ......................................... 277/27; 277/74;
  277/75; 277/88; 277/90
[58] Field of Search ....................... 277/27, 88, 90, 95,
  277/15, 3, 70, 71, 74, 75, DIG. 5

[56] References Cited
U.S. PATENT DOCUMENTS

| | | | |
|---|---|---|---|
| 1,315,822 | 9/1919 | Doran | 277/74 |
| 3,074,728 | 1/1963 | Freed | 277/90 X |
| 3,160,418 | 12/1964 | Barske | 277/90 |
| 4,021,050 | 5/1977 | Powers | 277/75 |

FOREIGN PATENT DOCUMENTS

| | | | |
|---|---|---|---|
| 2153403 | 5/1973 | Fed. Rep. of Germany | 277/74 |
| 413522 | 12/1966 | Switzerland | 277/74 |
| 899169 | 6/1962 | United Kingdom | 277/27 |
| 2124311 | 2/1984 | United Kingdom | 277/3 |

Primary Examiner—Allan N. Shoap
Attorney, Agent, or Firm—Eugene E. Renz, Jr.

[57] ABSTRACT

A seal comprising a gap between e.g. a flange (5) on a shaft and an element (6) arranged in a surrounding housing (2) is used for separating a fluid in a space (3) in the housing from the space (4) surrounding the housing. A pressurized fluid is supplied to the gap via a conduit (8) and a pocket (7) and flows to the space (3) and the space (4). The gap tends to be closed by the fact that the element (6) is elastically supported in the housing (2) by ductile membranes (10,11) and is pressed against the flange (5) by the pressure in the space between the membranes.

5 Claims, 1 Drawing Figure

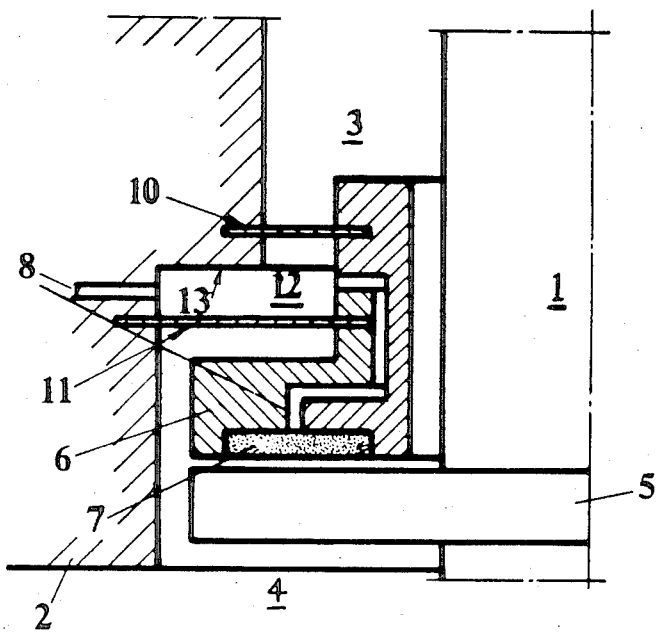

SEAL WITH PRESSURE FLUID FEED

FIELD OF THE INVENTION

The present invention relates to improvements in seals and particularly to an improvement in non-contacting seals.

BACKGROUND OF THE INVENTION

A seal of this kind can be used for e.g. sealing of a gap between a shaft and a housing for a pump, compressor or centrifuge, the pressure of the fluid situated inside the housing being frequently higher than the pressure of the atmosphere surrounding the housing. In such circumstances it is difficult to achieve a seal which has effective sealing properties and also gives small friction power losses. It is known to use sealing devices comprising sealing bodies made of resilient material which are pressed against a sliding surface by the pressure of the fluid to be sealed. Such a design very effectively prevents escape of the pressurized fluid, but friction losses and wear are considerable if the overpressure is great, and if the pressure ceases the sealing ability decreases or disappears. Lubrication may cause less power loss, but the environment is not always such that an efficient lubricant can be used. For example, lubricating oil must not be used in food processing machines where the oil might come into contact with the food. It is also known, e.g. from U.S. Pat. No. 3,880,434, to separate two spaces by introducing a pressure medium in a gap between two relatively rotatable surfaces, which gap communicates with said spaces. The pressure in the device is low and about equal in both spaces, and a pressure medium is supplied in great quantities to the gap, whereby a good separation of the spaces is assured as long as the pressure medium flows through the gap and out into both spaces. The consumption of pressure medium is, however, great if there is a great difference in pressure between the supplied pressure medium and the fluids situated outside the gap. If the supply of pressure medium is interrupted, the sealing function becomes uncertain. Only the resilient pre-stress of a bellows seal carrying one of the surfaces defining the gap can possibly contribute to closing the gap, thereby providing a sealing effect.

Whether this actually occurs is determined by the tension force in the bellows, the pressure difference, the design of the elements being provided with the surfaces defining the gap, etc.

The DE patent application No. 2153403 shows a pressure fluid operated seal comprising two parallel elastic annular membranes between which a pressure medium is supplied to a gap between two relatively rotatable surfaces. The seal comprises a device which prevents too fast an escape of pressure medium between the membranes and out of the gap. This arrangement is complicated and expensive, since it requires a special design of both the shaft and the surrounding housing.

The purpose of the present invention is to provide a seal of the kind stated above, which seal can be made of simple and inexpensive parts and be designed always to give a low consumption of the pressure medium supplied to the device. To this end, the seal comprises a pair of spaced flexible membranes connected to one of the members and an element disposed between the members, the element and other member having confronting faces defining a gap therebetween, means for supplying a pressurized fluid to the space between the membranes and to a pocket formed in one of said faces to provide a fluid seal between said confronting faces, said space defined by rigid walls of said one member and element and flexible membranes in a predetermined configuration so that the fluid pressure in said space deflects said membranes and said element in a direction tending to close the gap.

A device according to the invention requires a conventional shaft having one simple flange, and the interior of the surrounding house can be easily manufactured to the proper shape.

BRIEF DESCRIPTION OF THE DRAWING

The following is a detailed description of the invention with reference to the accompanying drawing, which shows a longitudinal section of parts of the sealing device and surrounding elements according to one embodiment of the invention.

DESCRIPTION OF THE PREFERRED EMBODIMENT

The FIGURE shows a shaft 1 which is rotatably arranged in a housing 2 for e.g. a compressor or a centrifuge. In the interior of the housing there is a space 3 which is filled by a fluid, i.e. a gas and/or liquid, which has a certain overpressure in relation to the pressure of a fluid surrounding the housing, which fluid is normally the atmosphere.

In the area of the passage of the shaft through the housing there is a seal for separating the fluid in the housing and the fluid surrounding the housing. The seal comprises a radial flange 5 which is fixed to the shaft, and an element 6 which is connected to the housing. The flange 5 and the element 6 have surfaces facing each other and movable in relation to each other. The surfaces define an intermediate gap, and the surface of element 6 has a pocket 7 open towards the surface on the flange 5. The pocket may be filled with a porous and gas permeable material. The pocket is suitably annular and concentric to the shaft 1 and the flange 5. A pressure medium, e.g. compressed air, can be fed to the pocket from an outer source, not shown, through a conduit 8. The pressure of the fluid fed to the pocket is to be so high, that the pressure in the pocket becomes higher than the pressure of the fluid in the space 3, whereby the fluid fed to the pocket spreads to the gap between the confronting surfaces on the flange 5 and the element 6. Thus, a portion of the fluid flows off to the exterior 4 of the housing, and a portion flows into the space 3.

The element 6 is connected to an elastically deformable member comprising two membranes 10, 11, which are suitably flat and arranged parallel to and at a distance from each other. They are fastened at one edge into the housing 2 and at another edge into the element 6. The element 6, the housing 2 and the membranes 10, 11 enclose a space 12, to which the pressurized fluid is fed from an outer source through the conduit 8 and from which the fluid is conducted to the pocket 7. The membrane 11 situated closest to the gap between the element 6 and the flange 5 has a surface portion which faces the space 12 and can be projected, in a plane mainly parallel to the radial extension of the gap, to a housing portion 13 taking up pressure from a fluid situated in the space 12. Thereby the pressure in the space 12 causes the membrane 11 to be pressed against the gap by a force which is greater than the force by which the membrane 10 is pressed in the opposite direction, so that the fluid introduced through the conduit 8 contributes to decreasing the gap. Accordingly, consumption of pressurized fluid supplied through conduit 8 can be kept low even if the overpressure in the space 3 should decrease or disappear.

The membranes 10, 11 may either be prestressed so that the gap tends to be closed by the prestress, or be arranged so that a gap is maintained when no pressurized fluid is supplied and no overpressure exists in the space 3.

Other embodiments of the invention than the one described above are possible. Thus, the seal may be arranged in a gap between two relatively linearly movable surfaces, the members 5, 6, 7, 10 and 11 thereby suitably being straight instead of annular. The seal may therewith be used in connection to e.g. a slide instead of a shaft. The elastically deformable members may have other shapes than the shape shown. They may have curved profiles, for example.

The seal is useful in various contexts, such as in pumps, fans, compressors, centrifuges and the like, and it is comparatively insensitive to radial and axial displacement of the shaft 1 in relation to the housing 2.

What is claimed is:

1. A seal for sealing the gap between substantially flat surfaces between two relatively movable members, a pair of spaced, flexible, substantially flat, impermeable membranes (10, 11) arranged substantially parallel to said surfaces and connected to one of the members and an element stationary relative thereto disposed between the members, the element and other member having confronting faces defining said gap therebetween, means for supplying a pressurized fluid to the space between the membranes and to a connected pocket formed in one of said faces to provide a fluid seal between said confronting faces, said space defined by rigid walls of said one member and element and flexible membranes in a predetermined configuration with at least one rigid wall extending across and within said space so that the fluid pressure in said space deflects said membranes and said element in a direction tending to close the gap.

2. A seal according to claim 1, wherein the membrane (11) situated closest to the gap has a surface portion which delimits said space (12) and which, in a plane substantially parallel to the radial extension of the gap, can be projected on a portion (13) of the housing which is subjected to pressure from the fluid in the space (12).

3. A seal according to claim 1, wherein the elastically deformable membranes (10, 11) are prestressed so that the gap tends to be closed by the prestress.

4. A seal according to claim 1, wherein the membranes are rotatable in relation to each other, and wherein the membranes (10, 11) are arranged substantially coaxially with the axis of rotation in a plane normal to said axis and that the pocket (7) to which a pressurized fluid is supplied is arranged in an annular element (6) connected to one edge of the membranes.

5. A seal for sealing the gap between substantially flat surfaces between two relatively movable members, a pair of spaced, flexible, substantially flat, impermeable membranes (10, 11) arranged substantially parallel to said surfaces and connected to one of the members and an element stationary relative thereto disposed between the members, the element and other member having confronting faces defining said gap therebetween, means for supplying a pressurized fluid to the space between the membranes and to a connected pocket formed in one of said faces to provide a fluid seal between said confronting faces, said space defined by a first rigid wall on said one member and a second rigid wall on said element forming the sides of said space, a first of said membranes and a portion of a third rigid wall extending across said space to form the top of said space and a second of said membranes forming the bottom of said space and having a greater surface of deflection than said top, so that the fluid pressure in said space deflects said membranes and said element in a direction tending to close the gap.

* * * * *